May 31, 1960 F. M. ATKINSON ET AL 2,938,752
APPARATUS FOR CONVEYING FINELY DIVIDED MATERIALS
Filed Feb. 7, 1957
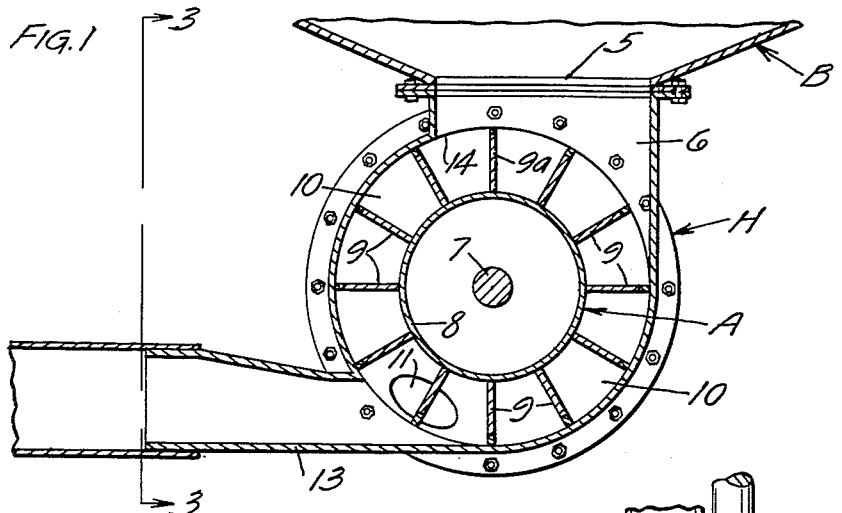
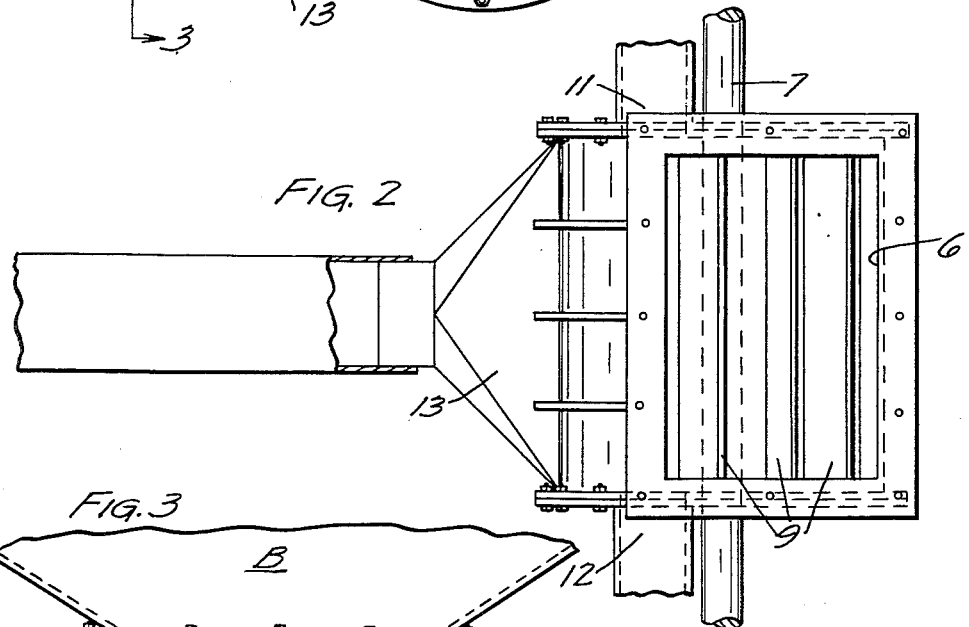
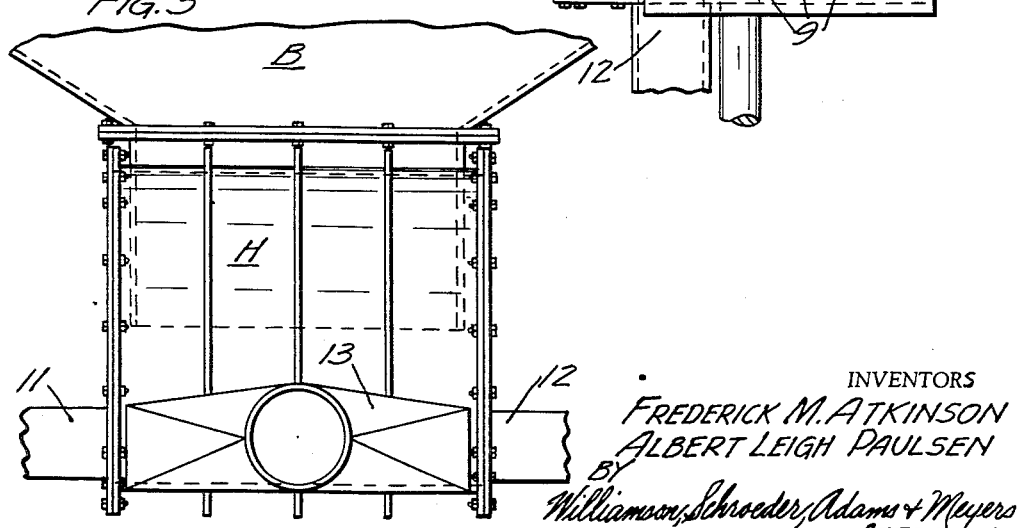
INVENTORS
FREDERICK M. ATKINSON
ALBERT LEIGH PAULSEN
BY
Williamson, Schroeder, Adams + Meyers
ATTORNEYS

United States Patent Office 2,938,752
Patented May 31, 1960

2,938,752

APPARATUS FOR CONVEYING FINELY DIVIDED MATERIALS

Frederick M. Atkinson, Wayzata, and Albert L. Paulsen, Minneapolis, Minn., assignors to Atkinson Bulk Transport Company, Minneapolis, Minn., a corporation of Minnesota Filed Feb. 7, 1957, Ser. No. 638,766

5 Claims. (Cl. 302—49)

This invention relates to the conveyance of granular and pulverulent materials. More particularly, it relates to apparatus for the movement of such materials by air in relatively high concentrations as relate to the amount of air utilized.

In recent years the manner of movement of granular and pulverulent materials through the use of air as a conveying medium has changed considerably as is set forth in United States Letters Patent No. 2,694,496 entitled "Method and Apparatus for Handling Pulverulent Materials" and United States Letters Patent No. 2,779,634 entitled "Actuator for Fluidized Conveying Systems." The emphasis within the various trades, such as flour milling and related industries, has been on an attempt to arrive at increasingly heavier concentrations of the pulverulent material as compared to the amount of air utilized. Our present invention is directed toward providing improved apparatus for conveying such materials, whether it be by pneumatic handling or by fluidization as defined in the above patents.

Various devices for causing such finely divided materials to flow through conduits against gravity in high concentrations have been designed for use within the trades. The most satisfactory means devised to date, however, involves the use of a rotary bladed air lock positioned across a gravity-fed bin outlet so that the blades of the air lock engage the material and carry it around to a communicating position between a compressed air inlet and a material discharge outlet. At this position the material is blown axially of the air lock and lengthwise of the blades through the discharge outlet as described in said United States Letters Patent No. 2,779,634. It has been conventional in such devices to position the material inlet of the air lock housing directly above the axis of rotation of the air lock. We have found, however, that we can increase the capacity of such a device by changing the position of this material inlet in a manner as will be hereinafter described.

We have discovered that an air lock such as is shown in Patent No. 2,779,634 with its material inlet positioned directly above its axis of rotation, although it contributes to a big improvement in the handling of pulverulent materials, does have certain limitations and disadvantages which preclude maximum concentrations being discharged therefrom. We have discovered that one reason for this is that each blade of the air lock, for at least half of the period during which it is passing by the material inlet, is moving against, instead of with, the general direction of movement of the material as it attempts to pass downwardly under the influence of gravity into the compartment or pockets defined by the blades of the air lock. As a result, the pockets or compartments are not properly filled and as a further result, the concentrations which are discharged are not as heavy as they could be. Another reason is that each compartment carries a charge of compressed air away from the discharge outlet back to the material inlet at which point it is released. Such air tends to disrupt the flow of material downwardly for the air obviously travels upwardly into the bin and through the material against its gravitational flow. Although such a release of compressed air may serve a useful purpose in preventing bridging of the material within the bin, it also has a definite detrimental effect in that it hinders the gravitational flow of the material into the compartment. Our invention is designed to obviate these disadvantages.

It is a general object of our invention to provide a novel and improved apparatus of simple and inexpensive construction for moving or conveying granular and pulverulent materials through the use of a stream of air.

A more specific object is to provide novel and improved apparatus for moving or conveying granular or pulverulent materials in heavier concentrations than has been heretofore possible with conventional equipment.

Another object is to provide novel and improved apparatus for conveying granular or pulverulent materials which utilizes a rotary air lock to effect the conveyance of the materials, the air lock being positioned relative to its material inlet in such a manner as to increase the concentrations of the material conveyed thereby.

Another object of our invention is to provide novel and improved apparatus for conveying granular or pulverulent materials which is constructed and arranged so as to increase the concentrations of the flow of material discharged therefrom and at the same time require less power in doing so.

Another object of our invention is to provide novel and improved apparatus for conveying granular or pulverulent materials which utilizes a rotary air lock to effect the conveyance of materials, the air lock being positioned relative to its material inlet so as to avoid changes in the directional movement of the material as it enters the air lock and thereby increase the concentrations of the flow of the material discharged therefrom.

Another object is to provide novel and improved apparatus for effecting the conveyance of granular or pulverulent materials which utilizes a rotary air lock to actuate the flow and which is constructed and arranged so as to utilize the gravitational movement of the material into the air lock to the maximum extent in order to effect filling of the pockets or compartments of the air lock to the fullest possible extent and thereby increase the concentration of the flow of the discharge material.

Another object of our invention is to provide improved apparatus for conveying granular or pulverulent materials which utilizes a rotary air lock constructed and arranged to expose the pockets or compartments thereof to the graviational flow of the material through the material inlet of the air lock for a longer period of time and thereby increase the concentration of the discharge flow of the material.

These and other objects and advantages of our invention will more fully appear from the following description, made in connection with the accompanying drawings, wherein like reference characters refer to the same or similar parts throughout the several views, and in which:

Fig. 1 is a vertical sectional view of one embodiment of our invention;

Fig. 2 is a plan view of the same; and

Fig. 3 is a side elevational view taken approximately along line 3—3 of Fig. 1.

One embodiment of our invention is shown in Figs. 1–3 mounted immediately below a bin indicated generally as B in position to receive granular or pulverulent material therefrom through an opening 5 at the bottom thereof. The invention as shown includes a housing indicated generally as H which has a material inlet 6 disposed immediately below the bin outlet 5. The housing H as shown, is preferably generally cylindrical in shape and it has mounted therewithin an air lock indicated generally as A. This air lock A is mounted for rotation within the housing H upon a transversely extending power driven shaft 7 and includes a drum-like member 8 which carries a plurality of radially and outwardly extending blades 9 upon its periphery. These blades are circumferentially spaced from each other and define pockets or compartments 10 therebetween. The outer ends of the blades 9 pass in close proximity to the inner surface of the cylindrical wall of the housing H so as to preclude any appreciable passage of air therebetween even though the air may be under relatively high pressure such as 10 to 30 p.s.i. The blades 9 extend lengthwise of the shaft 7 and sealing means is provided at the ends of these blades so as to preclude the escape of air from the pockets 10 except when they are positioned between the air inlets and the material discharge outlet of the housing H as will be hereinafter described. The air lock or actuator A is preferably constructed in accordance with the description and specification outlined in United States Letters Patent No. 2,779,634.

At each end of the housing H there is disposed a compressed air inlet such as 11 and 12, each of which is adapted to be connected to a source of compressed air, (not shown). These air inlets 11 and 12 are disposed opposite to each other and in the same radial plane relative to the air lock or actuator A. Extending tangentially from the lower portions of the housing H and in the direction of rotation of the air lock as indicated by the arrow as indicated in Fig. 1 is a material discharge outlet 13. It will be noted that this outlet is disposed tangentially relative to the path of movement of the bladed conveyor or air lock A. It will be readily understood that the air lock A constitutes a rotary conveyor which has pockets or compartments 10 arranged along its circumferential periphery. It will be noted that the air inlets 11 and 12 are slightly elongated and are oval shaped and that they simultaneously communicate with the material discharge outlet 13 and the interior of the individual compartments 10 as the air lock A rotates.

Reference to Fig. 1 shows that the material inlet 6 of the air lock or rotary conveyor A is offset relative to the vertical plane of the axis of rotation of the air lock which, of course, is the axis of the power driven shaft 7. In other words, the material inlet 6 has been shifted in the direction of rotation of the blades 9 to one side of the axis of the conveyor so that throughout most of the period that an individual blade 9 is passing by the inlet opening 6 it has a directional component which is the same as the direction of gravitational flow of the granular or pulverulent material from the bin B through the material inlet 6. For example, the particular blade 9a from its position as shown in Fig. 1 until it has completed its position by the material inlet 6 has at least some downward directional component and has no directional component in opposition to the gravitational flow of the pulverulent material. We have found that if the material inlet 6 is positioned directly above the axis of rotation of the air lock or carrier A, the upward movement of the blades 9a from the point where the blade first commences to pass by the material inlet 6 until it is directly above the shaft 7, has an upward directional component which works against the gravitational flow of material through the material inlet 6 so that as a result, the pockets or compartments 10 will not be completely filled by the time they have passed the material inlet 6. By positioning the material inlet 6 as shown in Fig. 1, we find that the pockets 10 will fill more completely than when the material inlet 6 is positioned as has been heretofore conventional. What we have done in effect, is to avail ourselves to the fullest possible extent of the downward gravitational flow of the material through the material inlet 6 rather than to fight or to oppose that flow.

When the compartments 10 leave the discharge outlet 13, they carry with them a charge of compressed air which is released as the forward blade which defines the pocket commences to pass the material inlet 6. This same condition, of course, exists in our improved device but by positioning the material inlet in the direction of rotation of the carrier A, we have succeeded in minimizing the adverse effects of the release of this pressure while still retaining its beneficial effects. As hereinbefore described, the release of this charge of compressed air when the material inlet is positioned as has heretofore been conventional, causes an upward passage of the air through the material which tends to oppose the gravitational flow of the material and it hinders complete filling of the compartment 10. By positioning the material inlet 6 as shown in Fig. 1, we have minimized this adverse effect for the filling of the compartments to the right of the blade 9a as viewed in Fig. 1 is at an elevation below the point 14 at which the compressed air will be released. Since the material entering the pockets is at a lower elevation and since the compressed air moves upwardly, no adverse effect will be felt by the material entering the pockets to the right of the blade 9a as viewed in Fig. 1. The escaping charge of compressed air, being at a higher elevation, will have no adverse effect upon the material entering the compartments 10 to the right of Fig. 1. In fact, we have found that the release of the charge of compressed air at 14 tends to create a suction effect at the opposite side of the material inlet so that the material will move downwardly into the pockets 10 more effectively and fill these pockets more completely.

It should also be noted that as a result of the positioning of the material inlet 6 as shown in Fig. 1, less power is required to drive or rotate the shaft 7 and its air lock carrier A. This is true because the blades 9 are not compelled throughout half of their arc of movement while passing the material inlet 6 to work against the gravitational flow of the material and lift the material with them. Thus it is clear that with the material inlet 6 positioned as shown in Fig. 1, the blades 9 work with the downward gravitational movement rather than against it and it is not necessary for the blades to impart any change in direction to the flow of the material as would be the case if the material inlet were positioned directly above the carrier A.

We have found that the structure shown in Figs. 1–3 has approximately a fifty percent higher capacity than the structure disclosed and claimed in United States Letters Patent No. 2,779,634, for example. The increased capacity appears to be the result of the combination of the double air inlet, the tangential discharge and the offset material inlet as disclosed and claimed herein. It appears from testing that approximately ten percent of the increased capacity is attributable to the offset inlet alone.

One of the reasons an increased capacity is attained through the device disclosed and claimed herein is that through the use of this device it is possible to get the finely divided material into the compartments of the rotary conveyor at the material inlet more effectively and to clean these compartments out more effectively at the discharge outlet. We have found, for example, that with the same size air locks or rotary conveyor, we can increase the speed of rotation of the conveyor from approximately 33–34 r.p.m.'s to 50 r.p.m.'s with a resulting substantial increase in capacity in the discharge conduit. With the structure disclosed and claimed in United States Letters Patent No. 2,779,634, it is of no avail to increase the speed of the air lock or rotary conveyor beyond the lower level (approximately 33–34 r.p.m.'s) because the material would fail to enter the compartments as well as the structure disclosed and claimed herein and the compartments would not be cleaned out as well even if the material were introduced into the compartments. In other words, a substantial portion of the material would appear to be carried around with the conveyor and back to the material inlet without having been discharged therefrom, assuming it was successful in entering the various compartments. From this it can be seen our device for handling finely divided materials has a distinct capacity advantage over the devices heretofore known and used, these advantages being the result of the features outlined herein.

It will, of course, be understood that various changes may be made in the form, details, arrangement and proportions of the parts without departing from the scope of our invention which consists of the matter shown and described herein and set forth in the appended claims.

What is claimed is:

1. Apparatus for use in the transportation of finely divided materials, said apparatus comprising a housing having a material-receiving inlet in its upper portion and having a material discharge outlet, rotary compartmentalized conveyor means mounted for rotation within said housing for movement of its compartments past said material-receiving inlet to receive such material therefrom within its compartments and conveying the same away therefrom, the compartments of said conveyor moving in sufficient proximity to the interior surface of said housing to prevent any appreciable passage of air under pressure therebetween, said housing having a pair of spaced differently directed air inlets each adapted to be connected simultaneously to a source of air under pressure, said air inlets and said material discharge outlet being arranged to simultaneously communicate with the individual compartments of said conveyor in succession as said conveyor moves along its path of conveyance whereby the material conveyed within the individual compartments will be discharged through said discharge outlet while said air inlets and said discharge outlet so communicate therewith, said material receiving inlet having material receiving inlet-defining walls having lower edges extending parallel to the outer edges of the compartment defining structure of said conveyor means, said material receiving inlet being offset in the direction of movement of said compartments as they pass thereby from a position directly above the axis of rotation of said conveyor whereby the loads of such material carried within the compartments of said conveyor and discharged through said discharge outlet will be increased, the air being directed into said air inlets constituting the major means for fluidizing and conveying the material through said discharge outlet.

2. Apparatus for use in the conveyance of finely divided materials, said apparatus comprising a housing having a material-receiving inlet in its upper portions and having a material discharge outlet, rotary compartmentalized conveyor means mounted for rotation within said housing for movement of its compartments past said material-receiving inlet to receive such material therefrom within its compartments and conveying the same away therefrom, the compartments of said conveyor moving in sufficient proximity to the interior surface of said housing to prevent any appreciable passage of air under pressure therebetween, said housing having a pair of differently directed spaced air inlets, each adapted to be connected to a source of air under pressure, said air inlets and said material discharge outlet being arranged to simultaneously communicate with the individual compartments of said conveyor in succession as said conveyor moves along its path of conveyance whereby the material conveyed within the individual compartments will be discharged through the discharge outlet while said air inlets and said discharge outlet so communicate therewith, said material discharge outlet being arranged and positioned to open tangentially of the path of conveyance of said conveyor, said material-receiving inlet having an inlet defining wall towards which the compartments of said conveyor rotate upwardly and which has a lower edge extending parallel to the outer edge of the compartment defining structure of said conveyor, said material inlet being offset in the direction of movement of said compartments of said conveyor from a position directly above the axis of rotation of said conveyor whereby the loads of such material carried by the compartments of said conveyor and discharged through said discharge outlet will be increased, the air being directed into said air inlets constituting the major means for fluidizing and conveying the material through said discharge outlet.

3. The structure defined in claim 2 wherein said air inlets are spaced longitudinally of the axis of rotation of said conveyor.

4. The structure defined in claim 2 wherein said air inlets are spaced longitudinally of the axis of rotation of said conveyor and inside the orbit of the outermost portions of said rotary conveyor, and said discharge outlet is disposed therebetween.

5. Apparatus for use in the transportation of pulverulent materials, said apparatus comprising a housing having a material-receiving inlet in its upper portion and having a material discharge outlet, rotary compartmentalized conveyor means mounted for rotation within said housing for movement of its compartments past said material-receiving inlet to receive such material therefrom within its compartments and conveying the same away therefrom, the compartments of said conveyor moving in such proximity to the interior surface of said housing to prevent any appreciable passage of air under pressure therebetween, said housing having an axially directed air inlet disposed inside the orbit of the outermost portions of said rotary conveyor means and adapted to be connected to a source of air under pressure, said air inlet and said material discharge outlet being arranged to simultaneously communicate with the individual compartments of said conveyor in succession as said conveyor moves along its path of conveyance whereby material conveyed within the individual compartments will be discharged through said discharge outlet while said air inlet and said discharge outlet so communicate therewith, said material-receiving inlet having an inlet-defining wall with a lower edge towards which the compartments of said conveyor rotate upwardly and which extends parallel to the outer edge of the compartment-defining structure of said conveyor means, said material inlet being offset in the direction of movement of said conveyor from a position directly above said conveyor whereby the loads of such material carried within the compartments of said conveyor and discharged through said discharge outlet will be increased.

References Cited in the file of this patent

UNITED STATES PATENTS

| | | |
|---|---|---|
| 1,038,806 | Welcker | Sept. 17, 1912 |
| 1,777,043 | Lanhoffer | Sept. 30, 1930 |
| 2,293,871 | Whitfield | Aug. 25, 1942 |
| 2,757,049 | Temple | July 31, 1956 |
| 2,795,464 | Richards | June 11, 1957 |
| 2,852,315 | Lenhart | Sept. 16, 1958 |

FOREIGN PATENTS

| | | |
|---|---|---|
| 597,492 | Germany | May 3, 1934 |
| 691,126 | Great Britain | May 6, 1953 |